United States Patent
Kranz (10) Patent No.: US 12,486,033 B2
(45) Date of Patent: Dec. 2, 2025

(54) CARGO LOADING SYSTEM AND CARGO LOADING METHOD FOR LOADING ULDS INTO AN AIRCRAFT

(71) Applicant: Airbus DS Airborne Solutions GmbH, Bremen (DE)

(72) Inventor: Willi Kranz, Bremen (DE)

(73) Assignee: Airbus DS Airborne Solutions GmbH, Bremen (DE)

(*) Notice: Subject to any disclaimer, the term of this patent is extended or adjusted under 35 U.S.C. 154(b) by 155 days.

(21) Appl. No.: 18/042,529

(22) PCT Filed: Jul. 6, 2022

(86) PCT No.: PCT/EP2022/068700
§ 371 (c)(1),
(2) Date: Feb. 22, 2023

(87) PCT Pub. No.: WO2023/285229
PCT Pub. Date: Jan. 19, 2023

(65) Prior Publication Data
US 2023/0382530 A1   Nov. 30, 2023

(30) Foreign Application Priority Data
Jul. 14, 2021   (DE) ..................... 10 2021 118 250.6

(51) Int. Cl.
*B64D 9/00*   (2006.01)
*B65G 65/00*   (2006.01)
(Continued)

(52) U.S. Cl.
CPC .......... *B64D 9/00* (2013.01); *B64D 2009/006* (2013.01); *B65G 65/00* (2013.01);
(Continued)

(58) Field of Classification Search
CPC .... B64D 9/00; B64D 2009/006; B65G 65/00; B65G 2203/042; G05B 19/4189; G06Q 10/083
See application file for complete search history.

(56) References Cited

U.S. PATENT DOCUMENTS 7,402,973 B2   7/2008   Hettwer
8,220,750 B2   7/2012   Hettwer
(Continued)

FOREIGN PATENT DOCUMENTS

CN   112678391 A   *   4/2021   ............. B65G 1/137
DE   10338704 A1       3/2005
(Continued)

OTHER PUBLICATIONS

International Search Report for International Patent Application No. PCT/EP2022/068700 dated Sep. 30, 2022; priority document.
(Continued)

*Primary Examiner* — Justin Holmes
(74) *Attorney, Agent, or Firm* — Greer, Burns & Crain, Ltd.

(57) ABSTRACT

A cargo-loading system and a cargo loading method for the at least semi-automated loading of a cargo hold of an aircraft with Unit Load Devices (ULDs). Drive elements of cargo handling power drive units are here controlled depending on coverage signals from sensors detecting coverage of the cargo handling power drive unit. A missing or lost coverage signal of a first cargo handling power drive unit is compensated by a control logic by requesting a coverage signal of at least one adjacent cargo handling power drive unit which should be covered by a standardized ULD together with the first cargo handling unit and, if such a coverage signal of an adjacent sensor is present, the coverage status of the first cargo handling power drive unit is set to "covered".

10 Claims, 3 Drawing Sheets

(51) Int. Cl.
G05B 19/418 (2006.01)
G06Q 10/083 (2023.01)

(52) U.S. Cl.
CPC .... *B65G 2203/042* (2013.01); *G05B 19/4189* (2013.01); *G06Q 10/083* (2013.01)

(56) References Cited

U.S. PATENT DOCUMENTS

| | | | |
|---|---|---|---|
| 8,308,107 | B2 | 11/2012 | Hettwer |
| 9,650,139 | B2 | 5/2017 | Huber et al. |
| 10,005,564 | B1 | 6/2018 | Bhatia et al. |
| 10,246,190 | B2 | 4/2019 | Harms et al. |
| 2007/0057120 | A1 | 3/2007 | Mcconnell |
| 2008/0167760 | A1* | 7/2008 | Scherenberger ....... G06Q 10/08 701/3 |
| 2009/0121085 | A1* | 5/2009 | Hettwer ................... B64D 9/00 244/137.1 |
| 2010/0213313 | A1 | 8/2010 | Reed et al. |
| 2015/0298808 | A1 | 10/2015 | Huber |
| 2018/0172827 | A1 | 6/2018 | Harms et al. |
| 2019/0210727 | A1 | 7/2019 | Harms et al. |
| 2020/0122835 | A1 | 4/2020 | Daw Perez et al. |
| 2020/0331610 | A1 | 10/2020 | Kish et al. |

FOREIGN PATENT DOCUMENTS

| | | | |
|---|---|---|---|
| DE | 102006058577 | A1 | 6/2007 |
| DE | 102007052633 | A1 | 7/2008 |
| DE | 102008052432 | A1 | 5/2009 |
| DE | 102008052468 | A1 | 5/2009 |
| DE | 102011000743 | B4 | 4/2012 |
| DE | 102011000819 | A1 | 8/2012 |
| DE | 102011000820 | B4 | 8/2012 |
| DE | 102014105657 | A1 | 10/2015 |
| DE | 102017130007 | A1 | 6/2018 |
| DE | 102017130009 | A1 | 6/2018 |
| DE | 202019103706 | U1 | 11/2019 |

OTHER PUBLICATIONS

German Search Report for German Patent Application No. 102021118250.6 dated Jun. 14, 2022; priority document.
Wikipedia, Unit Load Device, https://de.wikipedia.org/w/index.php?title=Unit_Load_Device&oldid=209350722; Jul. 27, 2021.

* cited by examiner

CARGO LOADING SYSTEM AND CARGO LOADING METHOD FOR LOADING ULDS INTO AN AIRCRAFT

CROSS-REFERENCES TO RELATED APPLICATIONS

This application is a national state of International Application No. PCT/EP2022/068700, filed on Jul. 6, 2022, which in turn claims priority to German Patent Application No. 10 2021 118 250.6, filed on Jul. 14, 2021, the entire disclosures of which are both incorporated herein by way of reference.

FIELD OF THE INVENTION

The invention relates to a cargo loading system and to a cargo loading method for loading a cargo hold of an aircraft with Unit Load Devices (ULDs). The invention also relates to a computer program with instructions for carrying out the cargo loading method. Lastly, the invention relates to an aircraft, in particular an airplane, comprising such a cargo loading system.

BACKGROUND OF THE INVENTION

Reference is made in particular to the following documents for a definition of terms, the technological background, and the prior art:
  [1] Unit Load Device—Wikipedia, downloaded from the Internet at https://de.wikipedia.org/wiki/Unit_Load_Device on 7 Jun. 2021
  [2] DE 20 2019 103 706 U1
  [3] DE 10 2014 105 657 A1
  [4] DE 10 2011 000 820 B4
  [5] DE 10 2011 000 819 A1
  [6] DE 10 2011 000 743 B4

Document [1] specifies what is understood by a Unit Load Device (ULD for short). Accordingly, this is a standardized air cargo container or air cargo pallet with a baseplate of predetermined size. In particular, there are ULDs with a larger width, which can for example take up the entire width of a cargo hold, and ULDs with a smaller width about half the size, which can be deposited for example on one half of the cargo hold. The length of the baseplate of the ULDs, measured perpendicular to the width, is also standardized and is selected from one or more possible lengths. Each ULD thus has a predetermined length. Cargo loading systems and cargo loading methods for loading cargo holds of aircraft with such ULDs are known from the documents [2] to [6]. In particular, the documents [3] to [6] disclose a cargo loading system for loading a cargo hold of an aircraft with Unit Load Devices (ULDs) which have a larger first or smaller second predetermined width and a predetermined length, wherein the cargo loading system comprises a first row of cargo handling power drive units and a second row of cargo handling power drive units, wherein the cargo handling power drive units each have a drive element for acting on the ULD for the purpose of driving a movement of the ULD, and a sensor which is designed to detect that the cargo handling power drive unit is covered by a ULD and output a coverage signal indicating the coverage, wherein the first and the second row are spaced apart from each other in the width direction such that ULDs with the first width cover cargo handling power drive units of the first and the second row for the purpose of being driven by them, and wherein the cargo handling power drive units are spaced apart in the respective row by a spacing in a longitudinal direction such that, when the ULDs are being conveyed, a number n of cargo handling power drive units adjacent in a longitudinal direction are always covered by a ULD, wherein n is a natural number greater than 1 The cargo loading systems known from [3] to [6] further comprise a control system which is designed to control the cargo handling power drive units depending on the coverage statuses, specified by the coverage signals of the sensors of the cargo handling power drive units, of the cargo handling power drive units. The document [5] moreover describes an entrance cargo handling device with an array of sensors close to a cargo door of the cargo hold with an assigned control system which recognizes the type of the ULD with the aid of a model of the coverage signals of the array. This is an example for a ULD detection device for detecting whether the ULD has the first or the second predetermined width.

Automated loading of cargo holds of aircraft, in particular airplanes, is possible with the abovementioned cargo loading systems. The ULDs are conveyed by means of cargo handling power drive units (PDUs for short) which with drive elements, usually rollers or balls, which are driven by an actuator in a controlled fashion via a control system. The PDUs are provided with sensors, usually optical sensors, which detect coverage of a PDU by a ULD and output a coverage signal. It is then detected in the control system with the aid of the coverage signals which PDU is currently covered by a ULD. By virtue thereof, different handling processes such as moving a row of ULDs inside onto free spaces, repositioning ULDs, unloading ULDs, etc can be controlled. Generally, only those drive means of the PDUs are moved which are covered by a ULD.

The coverage signal of each cargo handling unit is therefore an important input value for running the correct loading and unloading processes. Incorrect coverage signals can cause malfunctions. Considerable effort has therefore already been made to minimize such incorrect coverage signals. For this purpose, an improved and accordingly more complex sensor for detecting the coverage of a PDU has been proposed, for example, in the document
  [7] DE 10 2017 130 007 A1.

Otherwise, ULDs which generate incorrect coverage signals continue to be replaced.

SUMMARY OF THE INVENTION

An object of the invention is to improve a cargo loading system and a cargo loading method for at least semi-automated loading of a cargo hold of an aircraft in terms of avoiding stoppages or faults with reduced effort.

In order to achieve this object, the invention provides a cargo loading system and a cargo loading method according to one or more embodiments described herein.

Advantageous embodiments are the subject of additional and further embodiments.

According to a first aspect, the invention provides a cargo loading system for loading a cargo hold of an aircraft with Unit Load Devices (ULDs) which have a larger first or smaller second predetermined width and a predetermined (minimum) length, wherein the cargo loading system comprises:
  a first row of cargo handling power drive units and a second row of cargo handling power drive units, wherein the cargo handling power drive units each have a drive element for acting on the ULD for the purpose of driving a movement of the ULD, and a sensor which is designed to detect that the cargo handling power drive unit is covered by a ULD and output a coverage signal indicating the coverage, wherein the first and the second row are spaced apart from each other in the width direction such that ULDs with the first width cover cargo handling power drive units of the first and the second row for the purpose of being driven by them and ULDs with the second width cover cargo handling power drive units of just one of the first and the second row for the purpose of being driven by the latter, and wherein the cargo handling power drive units are spaced apart in the respective row by a spacing in a longitudinal direction such that, when the ULDs are being conveyed, a number n of cargo handling power drive units adjacent in a longitudinal direction are always covered by a ULD, wherein n is a natural number greater than 1, a ULD detection system for detecting whether the ULD has the first or the second predetermined width, and a control system which is designed to control the cargo handling power drive units depending on the coverage statuses, specified by the coverage signals of the sensors of the cargo handling power drive units, of the cargo handling power drive units, to generate a coverage status of the first cargo handling power drive unit by the control system in the case of no existing coverage signal of a sensor of a first cargo handling power drive unit when a) the ULD detection device has detected a ULD of the first width and a sensor of a cargo handling power drive unit, adjacent in the width direction to the first cargo handling power drive unit, of the adjacent row outputs the coverage signal, or b) the ULD detection device has detected a ULD of the first or second width and the sensor of at least one of the cargo handling power drive units, adjacent to the first cargo handling power drive unit, of the same row as the first handling device, outputs the coverage signal, and to carry out the controlling of the cargo handling power drive units with the coverage status generated in the same way as when the coverage status, generated by the coverage signal, of the first handling device is present.

The control system is preferably designed to generate the coverage status of the first cargo handling power drive unit in the case of no existing coverage signal of a sensor of the first cargo handling power drive unit when in case b) the sensors of n−1 of the cargo handling power drive units, adjacent to the first cargo handling power drive unit, of the same row as the first handling device output the coverage signal.

It is preferred that the control system is further designed to end the generation of the coverage status of the first cargo handling power drive unit when the sensor of the first cargo handling power drive unit outputs the coverage signal again, or in case a) the sensors of cargo handling power drive units, adjacent in the width direction, of the first and the second row, at least one of which is adjacent to the first cargo handling power drive unit, output the coverage signal, or in case b) the sensors of at least two cargo handling power drive units, situated one behind the other, of the same row as the first cargo handling power drive unit output the coverage signal.

The ending preferably takes place in case b) when the sensor of n cargo handling power drive units situated one behind the other, more preferably at least one cargo handling power drive unit of which is adjacent to the first cargo handling power drive unit, outputs the coverage signal.

It is preferred that the ULD detection device comprises an array of sensors of an entrance cargo handling device close to a cargo door of the cargo hold, and an evaluation unit which is designed to detect the ULD type with the aid of coverage signals of the sensors of the entrance cargo handling device.

According to a further aspect, the invention provides a cargo loading method for loading a cargo hold of an aircraft with Unit Load Devices (ULDs) which have a larger first or smaller second predetermined width and a predetermined length (in particular a predetermined minimum length), comprising:

Providing a first row of cargo handling power drive units and a second row of cargo handling power drive units which each have a drive element for acting on the ULD and a sensor which is designed to detect the coverage of the cargo handling power drive unit by a ULD and to output a coverage signal indicating the coverage, wherein the first and second row are spaced apart from each other in the width direction such that ULDs with the first width cover cargo handling power drive units of the first and the second row, and ULDs of the second width optionally cover cargo handling power drive units only of the first or only of the second row, and wherein the cargo handling power drive units in the respective row are spaced apart in a longitudinal direction with a spacing such that, when the ULDs are being conveyed, a number n of cargo handling power drive units adjacent in a longitudinal direction are always covered by a ULD, wherein n is a natural number greater than 1, Detecting whether a ULD to be conveyed has the first or the second width, and conveying the ULDs through the cargo hold with control of the cargo handling power drive units depending on the coverage statuses, specified by the coverage signals of the sensors of the cargo handling power drive units, of the cargo handling power drive units, Generating a coverage status of a first cargo handling power drive unit in the case of no existing coverage signal of the sensor of the first cargo handling power drive unit when a) the ULD detection device has detected a ULD of the first width and a sensor outputs the coverage signal to a cargo handling power drive unit, adjacent in the width direction to the first cargo handling power drive unit, or b) the ULD detection device has detected a ULD of the first or second width and the sensor outputs the coverage signal to at least one of the cargo handling power drive units, adjacent to the first cargo handling power drive unit, of the same row as the first handling device, and Controlling the cargo handling power drive units with the generated coverage status in the same way as when the coverage status, generated by the coverage signal, of the first handling device is present.

Preferably, in case b), the coverage status of the first cargo handling power drive unit is generated when the sensors of n−1 cargo handling power drive units, adjacent to the first cargo handling power drive unit, of the same row as the first handling device output the coverage signal.

The cargo loading method preferably comprises the step:

Ending the generation of the coverage status of the first cargo handling power drive unit when the sensor of the first cargo handling power drive unit outputs the coverage signal again, or in case a) the sensors of cargo handling power drive units, adjacent in the width direction, of the first and the second row, at least one of which is adjacent to the first cargo handling power drive unit, output the coverage signal, or in case b) the sensors of at least two cargo handling power drive units, situated one behind the other, of the same row as the first cargo handling power drive unit output the coverage signal.

It is preferred in case b) to end the generation of the coverage signal when the sensors of n cargo handling power drive units situated one behind the other, more preferably at least one cargo handling power drive unit of which is adjacent to the first cargo handling power drive unit, output the coverage signal.

It is preferred that the detection of whether a ULD to be conveyed has the first or the second width takes place by detecting a ULD type with the aid of coverage signals of an array of sensors of an entrance cargo handling device.

According to a further aspect, the invention provides a computer program containing machine-readable instructions which, when loaded into the control system of a cargo loading system according to one of the above embodiments, cause the cargo loading system to carry out the cargo loading method according to one of the above embodiments.

According to a further aspect, the invention provides an aircraft, in particular an airplane, comprising a cargo hold with a cargo loading system according to one of the above embodiments.

Details of further possible embodiments of the cargo loading system and the cargo loading method can be found in the documents [2] to [7], to which reference should be made for further details.

Preferred embodiments of the invention provide compensation of missing detection signals in the case of powered cargo loading systems. By means of a simple control solution which can be retrofitted easily in the case of existing systems such as, for example, the type known from [2] to [7], for example by a software update, faults in the automated unloading or loading process which up until now occur in the case of damaged or unclean ULDs or those incapable of detection can be avoided or at least significantly reduced.

BRIEF DESCRIPTION OF THE DRAWINGS

An exemplary embodiment is explained below with the aid of the attached drawings, in which.

DETAILED DESCRIPTION OF THE PREFERRED EMBODIMENTS

Figure 1:
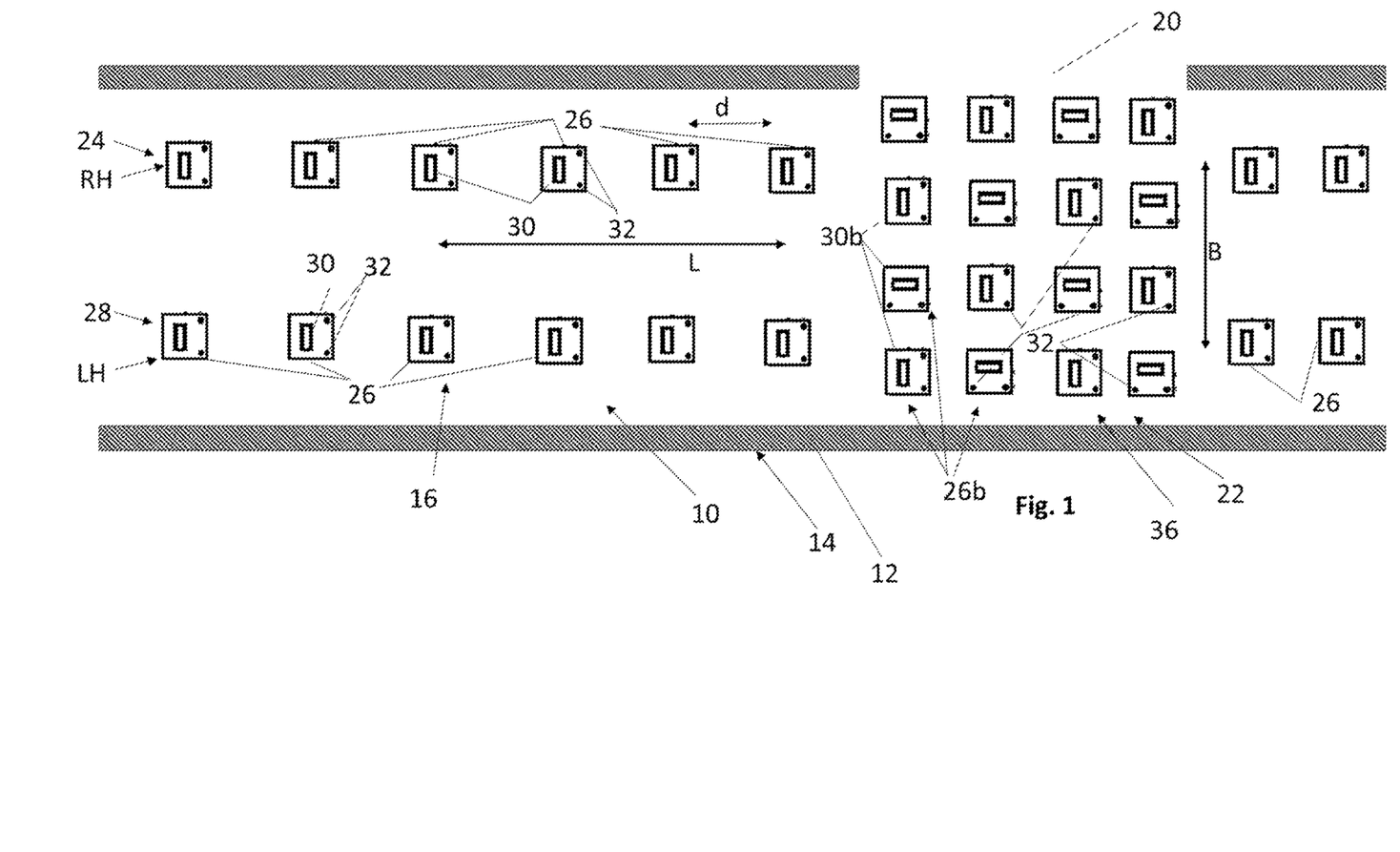
FIG. 1 shows a schematic illustration of a cargo hold of an aircraft with an exemplary embodiment of a cargo loading system.
Figure 2:
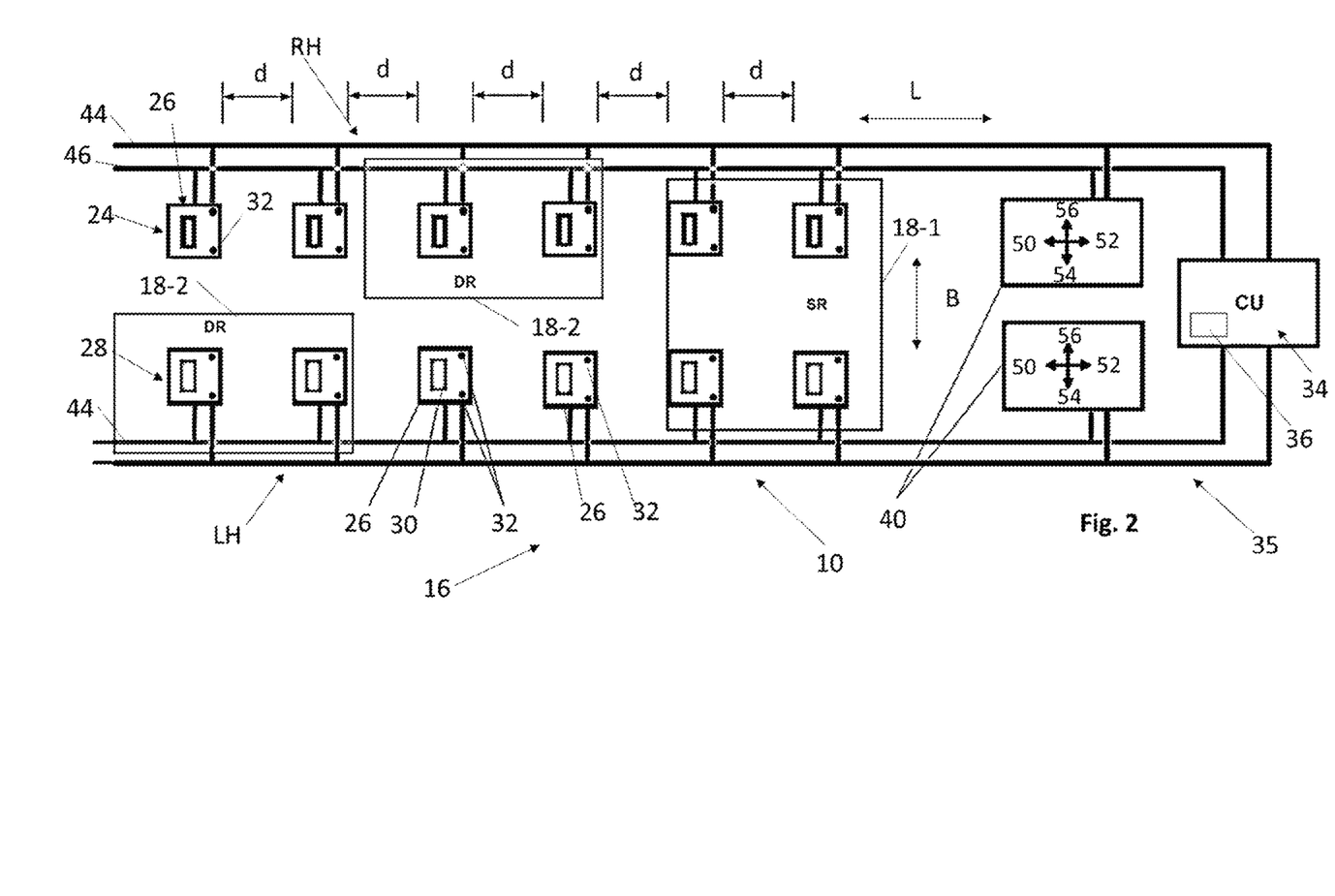
FIG. 2 shows a schematic block diagram of the basic architecture of the cargo loading system with some mechanical and electronic/electrical components; and, FIG. 3 shows an illustration as in FIG. 2, wherein possible compensations of missing detection signals are illustrated.
Figure 3:
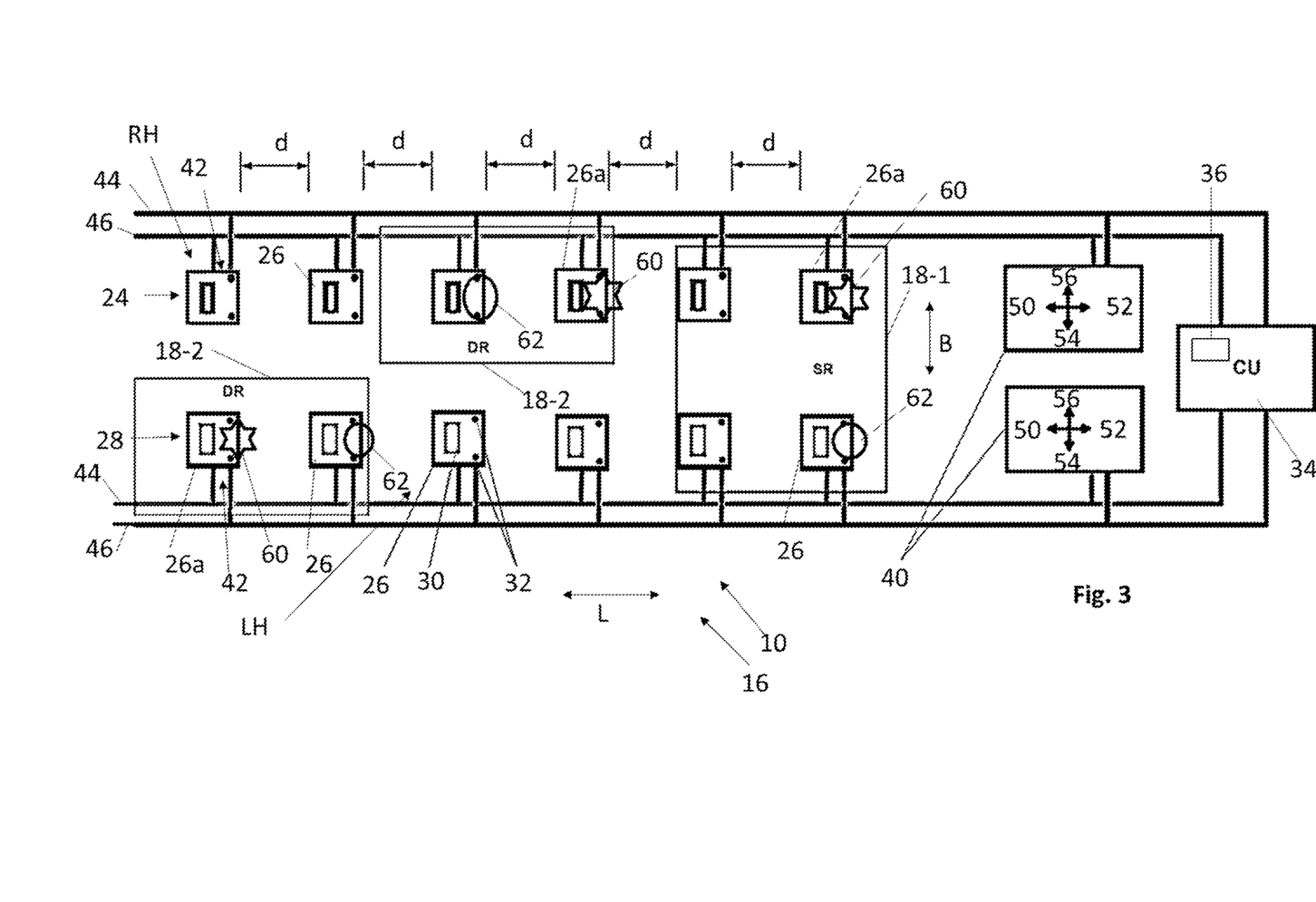

A cargo hold 10, for example at least part of a cargo deck, of an aircraft 12, in this case in the form of an airplane 14, is illustrated schematically in the Figures. The cargo hold 10 is provided with a cargo loading system 16. The cargo loading system 16 is designed for loading the cargo hold 10 with Unit Load Devices, referred to as ULDs 18-1, 18-2 for short below. Used as Unit Load Devices 18-1, 18-2 are one or more ULDs 18-1, 18-2 as described and shown in the document [1] (for example, one or more ULDs of the type LD1, LD2, LD3, . . . LDx). Reference should be made explicitly to the document [1] for further details.

The cargo loading system 16 is a modern cargo loading system (CLS for short) as described and shown in principle also from the documents [2] to [7]. Such modern cargo loading systems 16 (CLS) have at least (passive) mechanical parts such as, for example, roller or roll tracks with freely rotating conveyor rollers, ball mats (arrangement of spatially distributed rotatably mounted balls) with balls which can rotate freely in all directions, guides, locking means, etc. for suitable movement and locking of ULDs 18-1, 18-2.

If such modern cargo loading systems 16 as in the case of the designs illustrated are also provided with power drive units and a control system, they are called powered cargo loading systems (PCLS for short).

Possible passive mechanical parts such as the freely rotating rollers or balls, guides, locking means, etc. have been omitted in the illustrations for the sake of clarity. As shown in the illustrations, in the region of a cargo door 20 the cargo loading system 16 has an entrance cargo handling device 22 by means of which the ULDs 18-1, 18-2 which are to be conveyed through the cargo door 20 can be moved both in the width direction B and in the longitudinal direction L of the cargo hold 10.

The cargo loading system 16 furthermore has a first row 24 of cargo handling power drive units 26, 26a and a second row 28 of cargo handling power drive units 26, 26a.

Each cargo handling power drive unit 26, 26a in each case has at least one drive element 30 for acting on a baseplate of the ULDs 18-1, 18-2 to be conveyed for the purpose of moving the latter, and at least one sensor 32.

The drive element 30 is, for example, a roller or roll driven in rotation by an actuator such as, for example, a motor or the like.

The sensor 32 is designed to detect coverage of the respective cargo handling power drive unit 26, 26a by a ULD 18-1, 18-2 and to output a coverage signal. An example of such a sensor 32 is known from the document [7].

The entrance cargo handling device 22 also has (see FIG. 1) an array of power drive units 26b. These power drive units 26b each have at least one drive element 30b which is designed, for example, as a driven roll, and at least one of the sensors 32 for detecting the coverage by a ULD 18-1, 18-2. A first group of the power drive units 26b of the entrance cargo handling device 22 is oriented such that its drive element 30b causes the ULDs to be conveyed in the width direction B in order to move the ULDs IN through the cargo door 20 into the inside of the cargo hold 10, and in the opposite direction of rotation in order to move the ULDs to be unloaded OUT through the cargo door 20 from the inside of the cargo hold 10. The second group of power drive units 26b is, like the cargo handling power drive units 26, oriented such that the ULDs can be moved by being driven in the longitudinal direction L. An array of sensors 32 is formed on the entrance cargo handling device 22 by the sensors 32 of the power drive units 26b of the entrance cargo handling device. Although not illustrated in detail in FIG. 1, the individual power drive units 26b are provided with interfaces and connected to an energy supply line 44 and a data bus 46 in a similar fashion to the cargo handling power drive units 26, as is explained in more detail below with the aid of the example of the cargo handling power drive units 26.

The cargo loading system 16 further has a control system 34 for controlling the entrance cargo handling device 22 and the cargo handling power drive units 26 for the at least partially automated loading and unloading of the cargo hold 10.

The control system 34 controls the drive elements 30, 30b of the entrance cargo handling device 22 and the cargo handling power drive units 26, 26a depending on the coverage signals of their sensors 32. A part of the control system 34 is here designed as an evaluation unit for the entrance cargo handling device 22 to detect, with the aid of a model and/or the number of coverage signals of the sensors 32 of the entrance cargo handling device 22, the type of a ULD 18-1, 18-2 when it is moved inside, and thus also to detect whether it is a ULD 18-1 with a larger width, which can take up for example the majority of the width of the cargo hold 10, or a ULD 18-2 with a smaller width, which can take up a little less than half the width of the cargo hold 10.

The position of the individual ULDs 18-1, 18-2 in the cargo hold 10 is detected by the control system 34 in accordance with the coverage signals of the sensors 32 of the rows 24, 28 of cargo handling power drive units 26, 26a and the entrance cargo handling device 22, wherein each ULD 18-1, 18-2 has been detected accordingly in terms of its type when it entered by the ULD detection device 36 formed by the entrance cargo handling device 22 and the evaluation unit. The mechanical parts of the cargo loading system 16 are defined according to their spacing and position with the aid of the well-defined cargo units, ULDs 18-1, 18-2; the corresponding guides, locking means, drive elements 30 are adapted according to their position to the handling of the ULDs 18-1, 18-2.

With the aid of the maximum ULD weight (see document [1]), the driving forces of the power drive units 26, 26a, 26b (PDUs) are also designed for a predetermined conveying speed.

The number of cargo handling power drive units 26, 26a (PDUs) required in each case depends on some design criteria:
- The baseplate of a ULD 18-1, 18-2 could have some unevenness or raised or depressed areas where it is not possible to obtain sufficient contact pressure for transporting.
- The baseplate of a ULD 18-1, 18-2 could be wet and slippery such that a cargo handling power drive unit 26, 26a (PDU) is alone incapable of moving the ULD 18-1, 18-2 cleanly.
- Even if a cargo handling power drive unit 26, 26a is not functional, it is nevertheless also desirable to enable transporting.

By virtue of this, it is in principle provided in the case of the cargo loading system 16 that always at least two (n with n greater than 1) cargo handling power drive units 26 are provided below a ULD 18. Accordingly, the spacings d between cargo handling power drive units 26 in the rows 24, 28 are selected taking into account the lengths predetermined according to ULD 18-1, 18-2 such that each ULD 18-1, 18-2 covers at least n cargo handling power drive units 26. The definition of ULDs 18-1, 18-2 includes a larger possible range of dimensions and weights. These different ULDs 18-1, 18-2 (LDx) can be handled by two general loading configurations in the case of the cargo loading system 16 illustrated.

In a double row (DR for short) configuration, each side of the airplane 14, the right-hand side RH and the left-hand side LH, can be loaded and unloaded independently. The corresponding ULDs 18-2 have a corresponding smaller second width which corresponds to almost half the cargo deck of the airplane 14.

Larger ULDs 18-2 in the form of larger containers or larger heavy pallets need the complete width of the cargo deck. Because of the large size and the high weight, they moreover require more than two cargo handling power drive units 26, 26a (PDUs) for driving the transporting movement properly. They are loaded in a single row configuration (SR for short). Cargo loading systems 16 which are provided with corresponding cargo handling power drive units 26, 26a and the control system 34 in addition to the passive mechanical parts such as roller tracks, ball mats, guides, locking means, etc. are demanded by corresponding cargo companies to an increasingly large extent.

In addition to the control system 34 implemented, for example, by a computer unit, a monitoring system 35 of the cargo loading system 16 has the following equipment:
- one or more human-machine interfaces 40, in this case for example in the form of control panels which are provided with switches and/or joysticks and/or display devices and/or touchscreens or the like in order to control the transporting of the ULDs 18-1, 18-2 by basic commands such as, for example, LOAD 50/UNLOAD 52 and IN 54/OUT 56.
- The cargo handling power drive units 26 show to the control system 34 the detection of a baseplate of a ULD 18-1, 18-2.
- The cargo handling power drive units 26, 26a have an interface 42 for receiving basic control commands such as DRIVE, STOP, HOLD, RELEASE.

For this purpose, in the embodiments illustrated, the two rows 24, 28 are each provided with an independent energy supply line 44 and an independent data bus 46. Each power drive unit 26, 26a, 26b is connected by its interface 42 to the associated energy supply line 44 and the associated data bus 46. An independent human-machine interface 40 which is also connected to the energy supply line 44 and the data bus 46 is provided per row 24, 28. Moreover, the energy supply lines 44 and the data buses 46 are connected to the central control system 34, for example in the form of a computer unit CU. Generally, the signals of the equipment listed above can be transmitted via discrete I/O signals or via a data bus connection to a central computer unit (CU) which forms the control system 34. The data bus protocol can be, for example, one of usual data bus protocols such as ARINC, AFDX, CAN bus, Ethernet.

This information is combined in the control system 34. Based on the information from the human-machine interface 40 and the cargo handling power drive units 26, corresponding drive/stop and/or hold/release commands are calculated and sent to the cargo handling power drive units 26 involved or required.

The most simple logic is that a drive command in accordance with the LOAD/UNLOAD command or IN/OUT command provided at the human-machine interface 40 is passed to the power drive unit 26, 26b which detects the coverage by a baseplate of a ULD 18-1, 18-2.

Simple improvements to this basic logic can be used in order to drive the respective next or the last cargo handling power drive unit 26 (PDU) even when it is not covered by a ULD 18-1, 18-2.

However, all these possible logics for controlling the loading or unloading of the ULDs 18-1, 18-2 essentially depend on reliably establishing a coverage status using the corresponding coverage signal of the sensor 32 of the corresponding cargo handling power drive unit 26.

For this reason, the cargo handling power drive units 26 require sensors 32 which are of a high quality and high reliability and also have a high detection speed. In addition, the cargo handling power drive units 26 are also often provided with two or more sensors 32.

However, all of these efforts cannot solve a very simple problem:

The ULDs 18-1, 18-2 often have dirty or black surfaces.

There is sometimes a chemical reaction with sand, salt, and the like on the aluminum baseplate.

The roller element of the cargo handling power drive unit 26 itself leaves rubber marks on the surface of the baseplate.

In addition, the baseplate can have some scratches, depressed areas, or other damage.

These problems considerably reduce the probability of detection by the sensors 32 of the cargo handling power drive units 26. Therefore, ULDs 18-1, 18-2 are currently checked and maintained on a regular basis. Even very slight damage can cause the ULDs 18-1, 18-2 to become unusable in current automated cargo loading systems 16. They are often replaced prematurely. Moreover, the baseplates of ULDs 18-1, 18-2 have to be cleaned frequently.

There can also be problems with dirt on the surface of the sensors 32 themselves.

If a ULD 18-1, 18-2 is not detected correctly because of the abovementioned problems, the programmed control processes do not function correctly such that cargo handling staff frequently have to intervene manually.

The said problems can cause significant delays even in the case of minor causes. For example, the luggage of passengers who have already checked in earlier but have not yet arrived at the gate once the flight has been called has to be unloaded before take-off. If in such a case one of the abovementioned errors occurs, this results in further delays which can also be very expensive.

The abovementioned disadvantages also prevent better control logics and/or implementation of control restrictions for safety reasons.

However, the generally known arrangement of cargo handling power drive units 26 in such a way that more than one cargo handling power drive unit 26 is covered by a ULD 18-1, 18-2, and the known dimensions and shapes of the ULDs 18-1, 18-2 offer the possibility of a logical combination of sensor detection signals at a higher central control logic level. The abovementioned problems, which have existed for many years and have not been solved hitherto, can be solved simply and elegantly using such a logical combination of coverage signals.

As described above, a plurality of cargo handling power drive units 26 are provided below a ULD 18-1, 18-2 for the better transporting of a ULD 18-1, 18-2.

It is explained below with the aid of FIG. 3 how the abovementioned problems of false-negative coverage signals can be solved because of this fact.

If a ULD 18-1 is moved in a double-row configuration DR along a LH or RH side of the airplane, at least two cargo handling power drive units 26, 26a (arranged one after the other, i.e. arranged adjacently one behind the other in the respective row 24, 28) have to report at least one coverage status. One of the coverage statuses can revert to the status "not covered" or can be missing for any other reason as, for example, explained above in the list of simple problems. This is indicated in FIG. 3 by the star 60 for a first cargo handling power drive unit 26a. If just one coverage status (from a cargo handling power drive unit 26 in front of or after the first cargo handling power drive unit 26a which correspondingly does not send a coverage signal) remains on the same LH, RH side of the airplane (indicated by the circle 62 in FIG. 3), the coverage status for the first cargo handling power drive unit 26 with the missing coverage status can be set to "covered" by the control logic in the same way as when the coverage status is reported by sending the coverage signal—see star 60 in FIG. 3. The control logic can calculate the same drive commands as for the reported coverage status. Clean movement of the corresponding ULD 18-2 can be ensured by this procedure of a combination of a missing or lost coverage signal.

If a ULD 18-2 in a single-row configuration SR with a correspondingly larger first width is moved along both sides of the airplane LH and RH, at least two cargo handling power drive units 26 which are situated next to each other in the first row 24 and in the second row 28 have to report a coverage status "covered". A coverage status can revert to "not covered" or be missing for any other reason (see above). This is indicated in FIG. 3 by the star 60 for a first cargo handling power drive unit 26a. If just one coverage status "covered", for example by an adjacent cargo handling power drive unit 26 on the other side, i.e. in the other row, remains with respect to the corresponding first cargo handling power drive unit 26 (the fact that it remains is indicated in FIG. 3 by the circle 62), the coverage status for the first cargo handling power drive unit 26a with the missing coverage signal on the opposite side can be set to "covered" by the control logic in the same way as if the coverage status had been reported by the coverage signal. The corresponding status is indicated by the star 60 in FIG. 3. The control logic can calculate the same drive commands as for the "covered" coverage status reported by the coverage signal. With this intention, clean movement of the corresponding ULD 18-1 can be ensured compensation of the missing or lost coverage signal.

In both cases, DR configuration or SR configuration, the compensation of the missing or lost coverage signal is removed again when the cargo handling power drive unit 26 concerned, the first cargo handling power drive unit, sends the coverage signal again.

The combination of the missing or lost coverage signal is also removed again for the first cargo handling power drive unit 26a concerned in the double-row configuration DR if at least two cargo handling power drive units 26, one behind the other, are covered again.

In the single-row configuration SR, the compensation of the missing or lost coverage signal for the first cargo handling power drive unit 26a concerned is removed again if two cargo handling power drive units 26, situated next to each other, send the coverage signal again.

This additional logic can be added to already existing control systems. This can be effected by a code modification, for example a software update. Normally, control systems are implemented, for example, by software such as, for example, computer programs which runs on microcontrollers, hardware signal combinations, VHDL (Very High Speed Integrated Circuit Hardware Description Language) on an FPGA (field-programmable gate array).

The improvements illustrated here to cargo loading systems 16 and correspondingly to cargo loading processes which can be performed therewith are based on already installed equipment and do not need any additional components. The defined configuration of the arrangement of cargo handling power drive units 26 and the loading configuration is the basis for a logical combination of coverage signals which are present.

Normally, a control system for a cargo loading system 16 uses software which combines all the basic information. The control system evaluates the drive commands present which have been input by any human-machine interface 40 and determines the cargo handling power drive units 26 required for transporting the corresponding ULDs 18.

The above described additional logic can be added very simply to the basic logic. There are virtually no disadvantages.

However, the improvement in the transporting of ULDs is very significant. Each faulty configuration or poor or damaged surface of a ULD baseplate or dirty baseplates, sensor glass, or other circumstances which reduce the detection rate can be overcome by this simple extension of the logic.

In a further embodiment, the compensation logic described for the double-row configuration DR is also used for a single-row configuration SR.

A cargo loading system (16) and a cargo loading method for at least semi-automated loading of a cargo hold (10) of an aircraft (12) with Unit Load Devices (ULDs) (18-1, 18-2) have thus been described. Drive elements (30) of cargo handling power drive units (26, 26a) are here controlled depending on coverage signals from sensors (32) detecting coverage of the cargo handling power drive unit (26, 26a). A missing or lost coverage signal of a first cargo handling power drive unit (26a) is compensated by a control logic by requesting a coverage signal of at least one adjacent cargo handling power drive unit (26) which should be covered by a standardized ULD (18-1, 18-2) together with the first cargo handling unit (26a) and, if such a coverage signal of an adjacent sensor (32) is present, the coverage status of the first cargo handling power drive unit (26a) is set to "covered".

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 cargo hold
12 aircraft
14 airplane
16 cargo loading system
18-1 ULD (Unit Load Device—first width)
18-2 ULD (Unit Load Device—second width)
20 cargo door
22 entrance cargo handling device
24 first row
26 cargo handling power drive units
26a first cargo handling power drive unit (with missing or lost coverage signal)
26b power drive unit (of the entrance cargo handling device)
28 second row
30 drive element
30b drive element (of the entrance cargo handling device)
32 sensor
34 control system
35 monitoring system
36 ULD detection device
40 human-machine interface
42 interface
44 energy supply line
46 data bus
50 load
52 unload
54 in
56 out
60 missing coverage signal (results in a coverage status compensated by the control system)
62 coverage status reported
B width direction
d spacing
L longitudinal direction
LH left-hand side of the cargo hold
RH right-hand side of the cargo hold

The invention claimed is:

1. A cargo loading system for loading a cargo hold of an aircraft with Unit Load Devices (ULDs) which have a first predetermined width or a second predetermined width and a predetermined length, the first predetermined width being larger than the second predetermined width, and wherein the cargo loading system comprises:
a first row of cargo handling power drive units and a second row of cargo handling power drive units, wherein the cargo handling power drive units each have a drive element for acting on an ULD for driving a movement of the ULD and a sensor configured to detect that the cargo handling power drive unit is covered by a ULD and configured to output a coverage signal indicating the cargo handling power drive unit is covered by a ULD,
wherein the first row and the second row are spaced apart from each other in a width direction B such that ULDs with the first predetermined width cover cargo handling power drive units of the first and the second row in order to be driven by the cargo handling power drive units and ULDs with the second width cover cargo handling power drive units of just one of the first row or the second row in order to be driven by the cargo handling power drive units, and
wherein the cargo handling power drive units are spaced apart in the respective rows by a spacing (d) in a longitudinal direction L such that, when the ULDs are being conveyed, a number n of cargo handling power drive units adjacent in a longitudinal direction L are always covered by a ULD, wherein n is a natural number greater than 1;
a ULD detection system for detecting whether the ULD has the first predetermined width or the second predetermined width; and
a control system which is configured to control the cargo handling power drive units depending on coverage statuses, specified by the coverage signals of the sensors of the cargo handling power drive units, of the cargo handling power drive units, the control system further configured to generate a coverage status of a first cargo handling power drive unit by the control system in the case of no existing coverage signal of a sensor of a first cargo handling power drive unit when:

in case a) the ULD detection system has detected a ULD of the first predetermined width and a sensor of a second first cargo handling power drive unit of the adjacent row, adjacent in the width direction (B) to the first cargo handling power drive unit outputs the coverage signal, or in case b) the ULD detection system has detected a ULD of the first predetermined width or the second predetermined width and the sensor of at least one of the cargo handling power drive units, of the same row as the first cargo handling power drive unit, adjacent to the first cargo handling power drive which outputs the coverage signal, and wherein the control system is further configured to carry out the controlling of the cargo handling power drive units with the coverage status generated by the control system in the same way as when the coverage status, generated by the coverage signal, of the first cargo handling power drive units is present.

2. The cargo loading system as claimed in claim 1, wherein the control system is further configured to end the generation of the coverage status of the first cargo handling power drive unit when the sensor of the first cargo handling power drive unit outputs the coverage signal again, or in the case a) the sensors of cargo handling power drive units, adjacent in the width direction, of the first row and the second row, at least one of which is adjacent to the first cargo handling power drive unit, output the coverage signal, or in the case b) the sensor of at least two cargo handling power drive units, situated one behind the other, of the same row as the first cargo handling power drive unit outputs the coverage signal.

3. The cargo loading system as claimed in claim 1, wherein the control system is further configured to generate the coverage status of the first cargo handling power drive unit in the case of no existing coverage signal of a sensor of the first cargo handling power drive unit when in the case b) the sensors of n−1 of the first cargo handling power drive units, adjacent to the first cargo handling power drive unit, of the same row as the first handling device output the coverage signal, or in the case b) to end the generation of the coverage signal when the sensors of n cargo handling power drive units situated one behind the other output the coverage signal, or both.

4. The cargo loading system as claimed in claim 1, wherein the ULD detection device comprises:

an array of sensors of an entrance cargo handling device proximate to a cargo door of the cargo hold; and, an evaluation unit configured to detect the ULD type with the coverage signals of the sensors of the entrance cargo handling device.

5. A cargo loading method for loading a cargo hold of an aircraft with Unit Load Devices (ULDs) which have a first predetermined width or a second predetermined width, the first predetermined width being larger than the second predetermined width, and a predetermined length, the method comprising:

providing a first row of cargo handling power drive units and a second row of cargo handling power drive units which each have a drive element for acting on a ULD and a sensor configured to detect the coverage of the cargo handling power drive unit by a ULD and further configured to output a coverage signal indicating the coverage, wherein the first row and the second row are spaced apart from each other in a width direction (B) such that ULDs with the first predetermined width cover cargo handling power drive units of the first row and the second row, and ULDs of the second predetermined width cover cargo handling power drive units only of the first row or only the second row, and wherein the cargo handling power drive units in a respective row are spaced apart in a longitudinal direction L with a spacing (d) such that, when the ULDs are being conveyed, a number n of cargo handling power drive units adjacent in a longitudinal direction L are always covered by a ULD, wherein n is a natural number greater than 1;

detecting whether a ULD to be conveyed has the first predetermined width or the second predetermined width;

conveying the ULDs through the cargo hold with control of the cargo handling power drive units depending on the coverage statuses, specified by the coverage signals of the sensors of the cargo handling power drive units, of the cargo handling power drive units; and generating a coverage status of a first cargo handling power drive unit in the case of no existing coverage signal of the sensor of the first cargo handling power drive unit when in case a) a ULD of the first width has been detected and a sensor of a cargo handling power drive unit, adjacent in the width direction (B) to the first cargo handling power drive unit, of the adjacent row outputs the coverage signal, or in case b) a ULD of the first predetermined width or the second predetermined width has been detected and the sensor of at least one of the cargo handling power drive units, adjacent to the first cargo handling power drive unit, of the same row as the first cargo handling power drive device, outputs the coverage signal; and, controlling the cargo handling power drive units with the coverage status generated in the same way as when the coverage status, generated by the coverage signal, of the first cargo handling power drive device is present.

6. The cargo loading method as claimed in claim 5, wherein ending the generation of the coverage status of the first cargo handling power drive unit when the sensor of the first cargo handling power drive unit outputs the coverage signal again, or in the case a) the sensors of cargo handling power drive units, adjacent in the width direction (B), of the first row and the second row, at least one of which is adjacent to the first cargo handling power drive unit, output the coverage signal, or in the case b) the sensors of at least two cargo handling power drive units, situated one behind the other, of the same row as the first cargo handling power drive unit output the coverage signal.

7. The cargo loading method as claimed in claim 5, wherein the coverage status of the first cargo handling power drive unit is generated in the case b) when the sensors of n-1 of the cargo handling power drive units, adjacent to the first cargo handling power drive unit, of the same row as the first handling device output the coverage signal, or in the case b) the generation is ended when the sensors of n cargo handling power drive units, situated one behind the other, output the coverage signal, or both.

8. The cargo loading method as claimed in claim 5, wherein the detecting whether a ULD the first predetermined width or the second predetermined width takes place by detecting a ULD width with the coverage signals from an array of sensors of an entrance cargo handling device.

9. A non-transitory computer-readable storage medium storing computer executable instructions, when loaded into a control system of a cargo loading system, cause the cargo loading system to carry out the cargo loading method as claimed in claim 5.

10. An aircraft comprising a cargo hold with the cargo loading system as claimed in claim 1.

* * * * *